W. W. DEAN.
ELECTRIC MOTOR FOR TALKING MACHINES.
APPLICATION FILED JULY 17, 1918.
1,415,430.
Patented May 9, 1922.
2 SHEETS—SHEET 1.
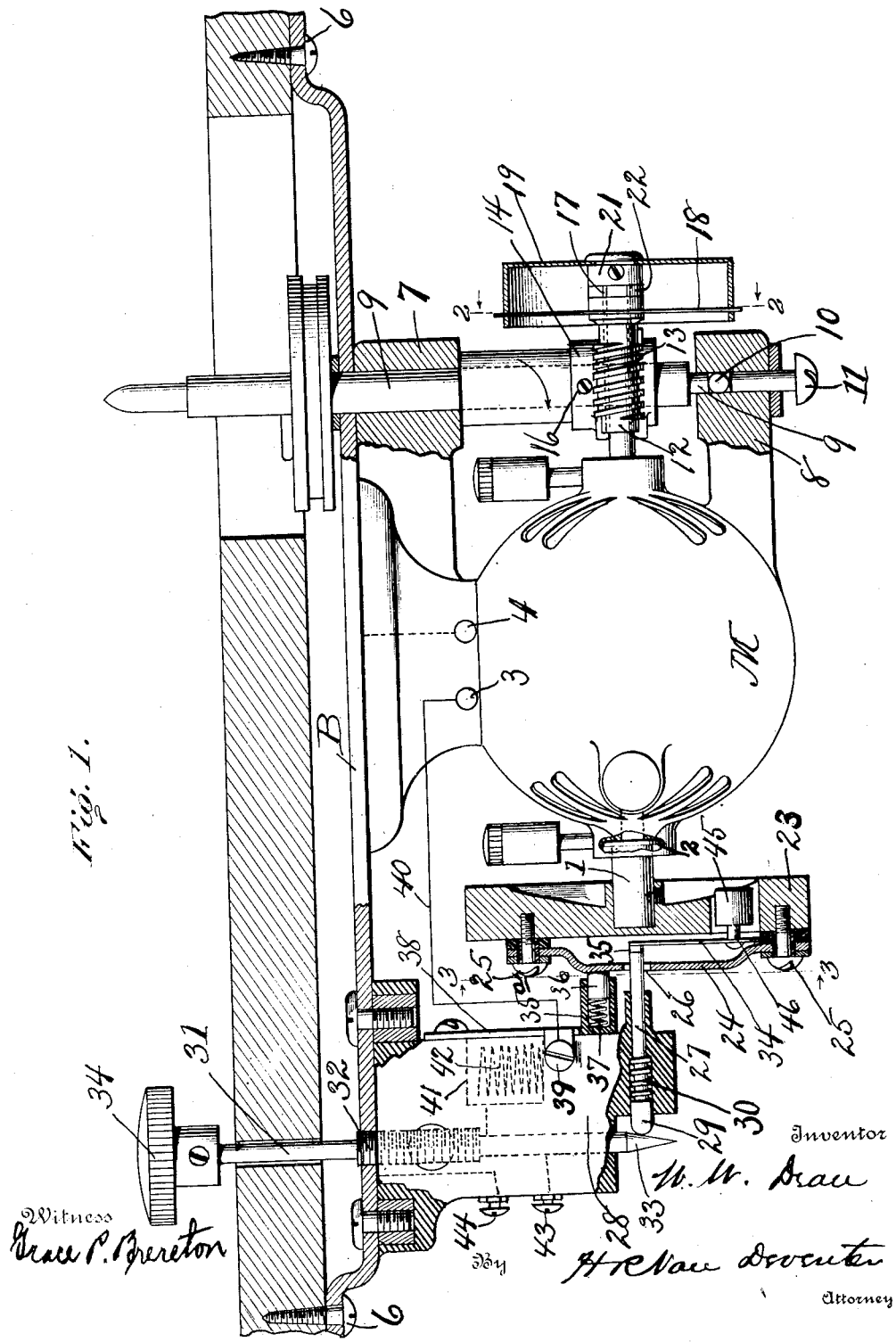

W. W. DEAN.
ELECTRIC MOTOR FOR TALKING MACHINES.
APPLICATION FILED JULY 17, 1918.
1,415,430.
Patented May 9, 1922.
2 SHEETS—SHEET 2.
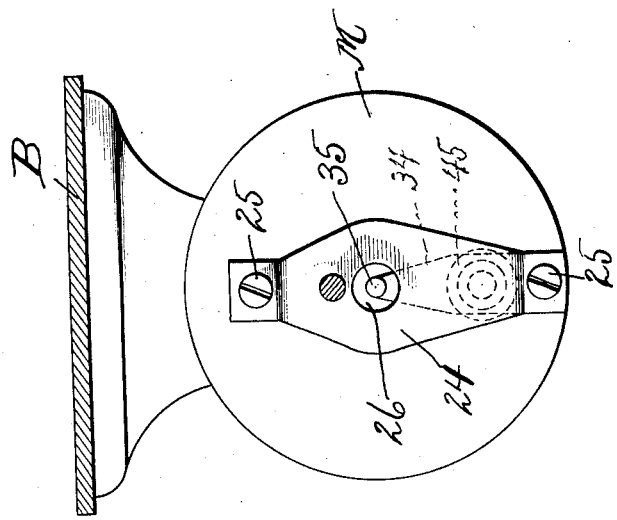
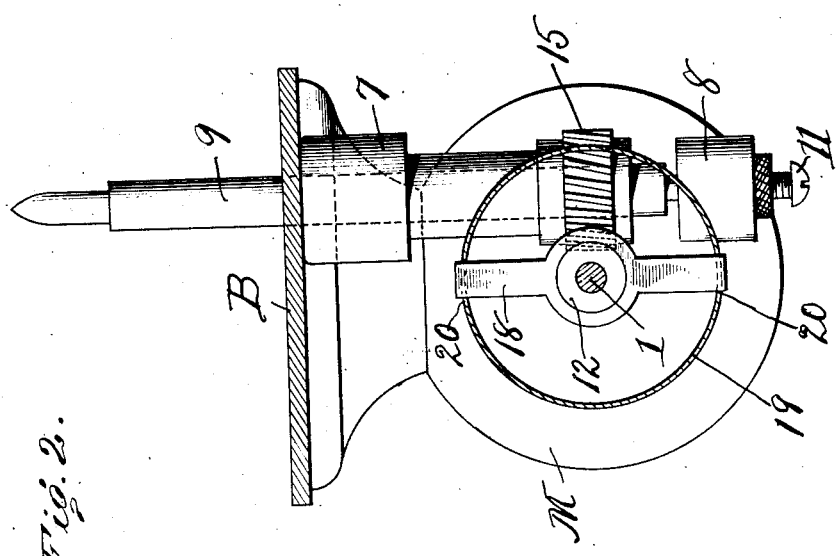

UNITED STATES PATENT OFFICE.

WILLIAM W. DEAN, OF NEWARK, NEW JERSEY, ASSIGNOR TO SPLITDORF ELECTRICAL COMPANY, OF NEWARK, NEW JERSEY, A CORPORATION OF NEW JERSEY.

ELECTRIC MOTOR FOR TALKING MACHINES.

1,415,430.

Specification of Letters Patent. Patented May 9, 1922.

Application filed July 17, 1918. Serial No. 245,358.

*To all whom it may concern:*

Be it known that I, WILLIAM WARREN DEAN, a citizen of the United States, residing at Newark, in the county of Essex and State of New Jersey, have invented certain new and useful Improvements in Electric Motors for Talking Machines, of which the following is a specification, reference being had to the accompanying drawing.

The invention relates to new and useful improvements in electric motors for talking machines and more particuarly to the arrangement of the motor, the means for supporting the same and the speed governing mechanism used in conjunction therewith.

It is well known that the end thrust on the motor shaft due to variatons in the voltage of the current supplied to the motor and disturbances in the load on the motor, cause the motor shaft to move endwise and this endwise movement of the motor shaft very greatly interferes with the speed governing of the motor so that it is very difficult in the present type of speed governors to obtain a very close regulation of the speed of the table of the talking machine operated by the motor.

An object of the present invention is to provide an equalizing mechanism in the train of mechanism between the motor shaft and the table of the talking machine, which enables this end thrust due to the causes specified, to be taken up without in anyway disturbing the effective control of the speed of the table through the speed governor driven by the motor shaft.

A further object of the invention is to provide a motor for operating the table of the talking machine with a speed governor which is connected to the shaft of the motor at one end thereof, while the table is operated from a connection to the motor shaft at the opposite end of the motor.

A still further object of the invention is to provide a construction wherein the governor is located very close to an end thrust bearing for the motor shaft, together with means for holding the bearing on the motor shaft continuously in contact with the end thrust bearing therefor.

A still further object of the invention is to provide a supporting base plate which carries the motor, the governor, the end thrust equalizing mechanism and the vertical shaft for operating the table of the talking machine.

These and other objects will in part be obvious and will in part be hereinafter more fully disclosed.

In the drawings which show by way of illustration one embodiment of this invention;

Figure 1 is a view partly in side elevation and partly in section showing one embodiment of my invention;

Fig. 2 is a sectional view on the line 2—2 of Fig. 1;

Fig. 3 is a sectional view on the line 3—3 of Fig. 1.

The invention is directed to an electric motor for operating a talking machine and more particularly to the governing mechanism therefor, which includes an equalizing mechanism for absorbing any endwise movement of the motor shaft so that the motor shaft will be maintained in a fixed endwise position as it rotates, notwithstanding the variation in the voltage of the current operating the motor and the variation in the load upon the motor. The motor is mounted on a supporting metallic base plate and projecting from the motor frame are spaced lugs having bearings for the vertical shaft which carries the table of the talking machine. Intermediate the motor and the vertical shaft is my improved equalizing mechanical shaft is my improved equalizing mechanism which consists of a positive driving connection between the motor shaft and the vertical shaft operating the table and devices which will absorb the endwise thrust which would otherwise be imparted to the motor shaft from the vertical shaft operating the table. This driving connection between the motor and the vertical shaft is in the form of a worm gear, the worm on one of the parts being mounted so as to be capable of a limited endwise yielding movement which absorbs the thrust imposed upon the operating train of mechanism. The speed governing mechanism is located at the opposite end of the motor shaft and consists of electric contacts, one of which is carried by a flexible arm having a weighted member intermediate the point of support for the arm and the contact carried thereby, which weighted member is operated upon by centrifugal force and serves under predetermined conditions to open the contacts and permit the same to close under other predetermined conditions. The motor shaft is moved endwise by a spring member which is preferably a part of the electric connections with the motor and the governor is disposed close to the end thrust bearing of the motor, so that temporary changes in the motor shaft will not affect the position of the governing mechanism.

Referring more in detail to the drawings, I have shown an electric motor at M which is carried by a metallic base plate B. The electric motor may be of the ordinary construction and includes an armature shaft 1 which is mounted to rotate in bearings in the motor frame. There is an end thrust bearing 2 adjacent the left hand end of the motor shaft, as viewed in Figure 1 of the drawings. The motor is provided with terminals 3 and 4, the terminal 4 being electrically connected to the metal base 5. This metal supporting base 5 is adapted to be secured to the frame of the machine by suitable screws 6. Projecting laterally from the motor frame are spaced arms 7 and 8 which are provided with bearings for a vertical shaft 9, which is adapted to extend above the frame of the machine and support the table of the talking machine. The lower end of the shaft is mounted on a ball 10 carried by an adjustable abutment 11. The motor shaft 1 is connected to the shaft 9 by a worm gear connecting mechanism. Mounted on the shaft 1 is a sleeve 12 which is formed with a helical thread 13 forming the worm gear. Mounted on the shaft 9 is a sleeve 14 which is formed with a worm gear 15 which meshes with the worm gear 13. The sleeve 14 is fixed to the shaft 9 by a screw 16. The sleeve 12 is free to slide on this motor shaft. The sleeve 12 is fixed to a spring plate 18 in any suitable way so that said spring plate 18 will move with the endwise movement of the sleeve and will rotate with the rotating movements of the sleeve. Fixed to the end of the shaft 1 is a drum 19 which is formed with slots 20—20 and the ends of the spring member 18 extend through these slots. The width of the slot is substantially the same as the spring plate 18 so that any rotating movements of the drum 19 will be imparted to the plate 18 and to the sleeve 12 to which the plate is attached. Mounted on the shaft 1 is a collar 21 and between this collar 21 and the end of the sleeve 12 is a felt collar 22. It will readily be seen that the rotating movements of the motor shaft 1 will be imparted to the drum 19 and through the drum 19, the sleeve 12 and through the gears 13 and 15 to the vertical shaft 9 and thence to the table of the talking machine. It will also be readily seen that any load on the shaft 9 tending to produce a back lash on the motor shaft or endwise movement thereof will be absorbed by this spring plate 18. This will be explained more fully in the description of the operation of the machine.

At the opposite end of the motor shaft 1 there is a fly wheel 23. Mounted on the fly wheel 23 is a disc 24. This disc is insulated from the fly wheel and secured thereto by suitable bolts 25. The disc 24 has an opening 26 formed therethrough. Extending through this opening is a rod 27. This rod 27 is mounted in a bracket 28 formed of insulating material. The rod has an enlarged end 29 and a spring 30 mounted in a seat in the bracket and bearing against this enlarged end normally forces the rod 27 outwardly away from the motor shaft. A shaft 31 formed with a threaded section 32 is mounted in this bracket 28. The lower end of this shaft is cone shaped as indicated at 33. This cone shaped end of the shaft 31 bears against the enlarged rounded end of the rod 27. At the upper end of the shaft 31 there is a knurl finger piece 34 which may be used for turning the shaft 31 to raise and lower the same and through the cone shaped end on the shaft vary the endwise position of the rod 27.

Clamped by the lower bolt 25 is a spring arm 34. This spring arm 34 carries a contact 35 at its upper end, which is adapted to cooperate with the inner end of the rod 27 which also serves as a contact. This spring arm 34 is insulated from the motor frame but is electrically connected with the disc 24. Mounted in a suitable housing 35ª carried by the bracket 28 is a metallic brush 36 which is pressed by the spring 37 against the disc 24. The pressure of the brush is sufficient to make good electrical contact and furthermore sufficient to push the shaft 1 so as to hold the same against the thrust bearing 2 and thus prevent endwise movement of the shaft as it rotates. The housing 35ª is carried by a plate 38 which is screwed to the bracket and this plate 38 carries a terminal 39 which is connected by wire 40 with the terminal 3 and the terminal 3 is in turn connected with one brush of the motor. Located in a suitable recess 41 in the bracket 28 is a resistance coil 42. One end of the resistance coil is connected to the terminal 39 and the other is connected through the shaft 31 with a terminal 43. The terminal 44 is connected with the supporting plate 5 and with the terminal 4 which leads to the other brush. The terminals 43 and 44 are connected to any suitable source of current supply.

Mounted on the spring arm 34 is a weight 45. Said weight is connected to a projecting arm 46 so that the center of the weight is at one side of the plane of the arm 34. As the motor shaft rotates, this weight will be acted upon by centrifugal force and if the shaft reaches a predetermined speed, the weight will swing or move outwardly sufficient to separate the contact 35 from the rod 27 thus breaking the circuit through these contacts. When the contacts are closed, the circuit leads from the source of supply through the terminal 43, the shaft 31, the rod 27, the spring arm 34, the disc 24, the brush 36, the terminal 39 to the terminal 3 of the motor. When however the contacts 25 and 27 are separated then the circuit supply leads from the terminal 43 through the resistance coil 42 to the terminal 39 and thence to the terminal 3.

Let it be supposed for example that the motor has to be regulated to take care of voltage variation between ninety volts and 120 volts and the desired motor speed is eleven hundred and fifty R. P. M. to give 78 R. P. M. to the table of the talking machine. The resistance 42 will be so proportioned that with 120 volts and with a resistance in circuit, the motor will run too slow to give the desired speed. While with 90 volts and the resistance short circuited, the motor will run a little too fast to give the desired speed. It will thus be seen that with the voltage varying from 90 to 120 when the resistance is cut out, the motor will always speed up and likewise when the resistance is cut in the motor will always slow down. In obtaining the initial adjustment, the finger piece or knob 34 is turned until the governor contacts are adjusted, using 110 volt current as standard, to obtain the desired number of revolutions of the record table. The number of revolutions may be measured in any desired way. By adjusting the shaft 31, the position of the rod 27 may be varied so as to vary the number of revolutions imparted to the table per minute but when this rod is once set say for 78 R. P. M. on the table, then the governor will accurately control the speed of the motor so that the record table will not vary from its desired fixed speed. If the voltage varies and even varies widely, the governor will readily take care of such variations and maintain the fixed predetermined speed. In order that this speed may be maintained very accurately and not vary even a fraction of a revolution per minute, it is necessary that the motor shaft shall rotate in a fixed endwise position, for any endwise shift of the motor shaft will vary the relative positions of the contact 35 and the end of the rod 27 and thus destroy or render inefficient the control by the governor. The shaft 9 rotates in a clockwise direction. In order to accomplish this, the motor shaft as viewed from the governor end of the shaft, also rotates in a clockwise direction. In event of any increase of the load on the shaft 9, the spring member 18 will be moved to the right, increasing the pressure on the felt collar 22 and reacting on the drum 19. There will however, be no tendency to endwise movement of the shaft 1, as this spring member 18 has shifted sufficient to take up this endwise thrust which would otherwise be imparted to the motor shaft. It will be understood of course that the felt collar may be dispensed with. The principal reason for utilizing this felt collar is to do away with all possible noise. Consider however, that the reverse takes place; that is, that the table runs ahead, owing for example to a drop in the voltage, which slackens the speed of the motor, the shaft 9 tends to continue its rotation due to the momentum of the table and therefore, the sleeve 12 carrying the worm gear 13 will be moved inwardly or to the left as viewed in Figure 1, drawing the spring member 18 away from the felt collar 11. Again it will be noted that the motor shaft is not moved endwise and consequently the relative position of the contact 35 and the rod 27 are not in anyway disturbed.

The governor spring arm 34 tends normally to hold the contact 35 in engagement with the rod 27 and this short circuits the resistance 42. When the speed of the motor increases, the weight 45 moves to the right, thereby opening the contacts and the resistance 42 is placed in series with the motor windings. This immediately causes a drop in speed, whereupon the governor contacts 35 and 27 close again short circuiting the resistance 42 causing the motor to speed up. In this way the resistance is thrown into and out of the circuit and the speed of the motor is very accurately maintained at a predetermined speed.

While I have shown the equalizing mechanism as carried in part by the motor shaft, it will be understood that this equalizing mechanism may be disposed at any point in the train of mechanism between the motor shaft and the table of the talking machine. It will be noted that this equalizing mechanism while it is capable of taking up the end thrust, is at the same time a positive forward drive and thus the motor shaft and the shaft supporting the table of the talking machine are maintained in perfect synchronism. It is obvious that minor changes in the details of construction and the arrangement of parts may be made without departing from the spirit of the invention as set forth in the appended claims. While I have described my improved governor as especially adapted for controlling the speed imparted by a motor to the record table of a talking machine, it will be understood that it may be used in other relations and with other devices.

Having thus fully described my invention, what I claim as new and desire to secure by Letters Patent is:—

1. The combination with an electric motor having a driving shaft, of a driven shaft, and a train of mechanism for imparting movements from the motor shaft to the driven shaft, said train of mechanism including a resilient device for absorbing any end thrust which may be imposed upon said train of mechanism by the driven shaft.

2. The combination with an electric motor having a driving shaft, of a driven shaft arranged at right angles thereto, and a train of mechanism for imparting movements from the motor shaft to the driven shaft, said train of mechanism including a worm gear and a resilient device cooperating therewith for absorbing any end thrust which may be imparted by the worm gear on the motor shaft.

3. The combination with an electric motor having a driving shaft, of a driven shaft arranged at right angles to the driving shaft, worm gears for connecting the motor shaft and the driven shaft, the worm gear on one of said shafts being supported thereon, whereby it may be moved endwise of the shaft in response to an end thrust thereon by the driven shaft, and a resilient connection between said endwise shiftable worm gear and the shaft supporting the same, which permits the gear to move endwise but which causes the shaft and gear to rotate together.

4. The combination with an electric motor having a driving shaft, of a driven shaft, a centrifugally operated governor for controlling the supply of current to the motor, said governor including a contact supported by the shaft and a second contact movable in a direction parallel with the motor shaft, and a train of mechanism for imparting movement from the motor shaft to the driven shaft, said train of mechanism including a resilient device for absorbing any end thrust which may be imposed upon the train of mechanism by the driven shaft.

5. The combination with an electric motor having a driving shaft, of a driven shaft and a governor for controlling the supply of current to the motor, said governor including an adjustable fixed contact, a spring arm carried by the motor shaft, a contact carried by said arm and adapted to engage the fixed contact, a weight fixed to said arm and disposed so as to move the end of the arm carrying the contact in a line parallel with the armature shaft, and a train of mechanism between the motor shaft and the driven shaft including a resilient device for absorbing any end thrust which may be imposed upon said train of mechanism by the driven shaft.

6. The combination with an electric motor having a driving shaft, of a driven shaft and a governor for controlling the supply of current to the motor, said governor including an adjustable fixed contact, a spring arm carried by the motor shaft, a contact carried by said arm and adapted to engage the fixed contact, a weight fixed to said arm and disposed so as to move the end of the arm carrying the contact in a line parallel with the armature shaft, and a train of mechanism between the motor shaft and driven shaft including a worm gear slidably mounted upon the motor shaft, a spring plate connected to said worm gear member fixed to said shaft and connected with the outer ends of the spring plate.

7. The combination with an electric motor having a driving shaft, of a driven shaft and a governor for controlling the supply of current to the motor, said governor including an adjustable fixed contact, a spring arm carried by the motor shaft, a contact carried by said arm and adapted to engage the fixed contact, a weight fixed to said arm and disposed so as to move the end of the arm carrying the contact in a line parallel with the armature shaft, a train of mechanism between the motor shaft and driven shaft including a worm gear slidably mounted upon the motor shaft, a spring plate connected to said worm gear, a member fixed to said shaft and connected with the outer ends of the spring plate, a felt collar disposed between the worm gear and a stop collar on the end of the shaft.

8. The combination with an electric motor having a driving shaft, of a driven shaft at right angles to the driving shaft, a governor for controlling the supply of current to the motor including a fixed contact and a centrifugally controlled movable contact supported by said driving shaft and disposed so as to move in a direction parallel with the axis of said driving shaft, a sleeve slidable on the motor shaft and carrying a worm gear, a worm gear on the driven shaft meshing with the worm gear on the motor shaft, a member fixed to the motor shaft and a yielding spring member interposed between the sleeve and the fixed member.

9. The combination with an electric motor having a driving shaft, of a driven shaft at right angles to the driving shaft, a governor for controlling the supply of current to the motor including a fixed contact and a centrifugally controlled movable contact disposed so as to move in a direction parallel with the axis of the motor shaft, a sleeve slidable on the motor shaft and carrying a worm gear, a worm gear on the driven shaft meshing with the worm gear on the motor shaft, a drum fixed to the end of the shaft, a spring plate fixed to the sleeve and connected to the drum at its outer ends so that the rotating movements of the motor shaft through the drum and spring plate are imparted to the sleeve, said spring plate being disposed so as to permit the sleeve to move endwise on the motor shaft to take up all end thrust imposed on the driving worm gear by the driven shaft.

10. The combination of a motor frame having a motor shaft, an end thrust bearing adjacent one end of the motor shaft, a fly wheel mounted on said end of the motor shaft, a centrifugally controlled movable contact carried by the fly wheel, a contact disc carried by the fly wheel, an adjustable contact cooperating with the movable contact, a spring prssed brush bearing against the disc and forcing the shaft against the thrust bearing whereby said motor shaft is held from endwise movement as it rotates, a driven shaft at the opposite end of the motor shaft, a worm gear slidably mounted on the motor shaft and engaging a worm gear on the vertical shaft, resilient means for conecting the sliding worm gear to the motor shaft whereby said worm gear may move endwise of the motor shaft and thus absorb any end thrust imposed upon the driving worm gear by the driven shaft.

11. The combination with an electric motor having a motor frame having an end thrust bearing for the motor shaft, a centrifugally operated governor for controlling the current supply to the motor, said governor having a contact movable with and in a direction parallel with the axis of the motor shaft and yielding means for forcing the motor shaft against the end thrust bearing, a driven shaft and a train of mechanism between the driven shaft and the motor shaft including a resilient device for absorbing any end thrust which may be imposed upon the train of mechanism by the driven shaft.

12. The combination with an electric motor having a driving shaft, a driven shaft arranged at right angles to the driving shaft, a sleeve slidable on the driving shaft and carrying a worm gear, a worm gear on the driven shaft meshing with the worm gear on the driving shaft, a drum fixed to the end of the driving shaft, a spring plate fixed to the sleeve and connected to the drum at its outer ends so that the rotating movements of the driving shaft through the drum and spring plate are imparted to the sleeve, said spring plate being disposed so as to permit the sleeve to move endwise on the motor shaft to take up all end thrusts imposed on the driving worm gear by the driven shaft.

In testimony whereof I hereunto affix my signature.

WILLIAM W. DEAN.